US008654526B2

(12) United States Patent
Wu et al.

(10) Patent No.: US 8,654,526 B2
(45) Date of Patent: Feb. 18, 2014

(54) FLAT PANEL DISPLAY HAVING STORABLE PEDESTAL

(75) Inventors: Chao-Hsiung Wu, New Taipei (TW); Chun-Ming Liu, New Taipei (TW)

(73) Assignee: HannStar Display Corp., Wugu Dist., New Taipei (TW)

( * ) Notice: Subject to any disclaimer, the term of this patent is extended or adjusted under 35 U.S.C. 154(b) by 105 days.

(21) Appl. No.: 13/456,221

(22) Filed: Apr. 26, 2012

(65) Prior Publication Data

US 2013/0107430 A1 May 2, 2013

(30) Foreign Application Priority Data

Nov. 2, 2011 (TW) .............................. 100139935 A (51) Int. Cl.
*G06F 1/16* (2006.01)
*F16M 11/16* (2006.01)
*A47B 91/00* (2006.01)

(52) U.S. Cl.
USPC ............ 361/679.59; 361/679.55; 361/679.56; 248/188; 248/188.8

(58) Field of Classification Search
USPC ............. 361/679.01–679.45, 679.55–679.59; 248/188–188.8, 917–924; 400/681; 312/223.1, 223.2
See application file for complete search history.

(56) References Cited

U.S. PATENT DOCUMENTS

| 6,603,656 | B2 * | 8/2003 | Cho et al. ................. | 361/679.02 |
| 6,772,983 | B1 | 8/2004 | Liao | |
| 7,328,880 | B2 * | 2/2008 | Helot et al. .............. | 248/346.01 |
| 7,681,848 | B2 * | 3/2010 | Choi .......................... | 248/188.8 |
| 8,000,092 | B2 * | 8/2011 | Kim ......................... | 361/679.21 |
| 8,002,228 | B2 * | 8/2011 | Wang et al. ................ | 248/349.1 |
| 8,390,996 | B2 * | 3/2013 | Park ........................ | 361/679.22 |
| 2003/0021084 | A1 | 1/2003 | Cho | |
| 2008/0186661 | A1 * | 8/2008 | Hsu ............................... | 361/681 |

FOREIGN PATENT DOCUMENTS

| EP | 1 298 520 A1 | 4/2003 |
| JP | 8204348 | 8/1996 |

* cited by examiner

*Primary Examiner* — Jayprakash N Gandhi
*Assistant Examiner* — Nidhi Desai
(74) *Attorney, Agent, or Firm* — Winston Hsu; Scott Margo (57) ABSTRACT

A pedestal structure of a flat panel display is made storable and disposed at the bottom of a main body of the flat panel display. The pedestal structure has substantially similar shape as a container of the main body that contains the pedestal structure and is capable of being completely hid in the main body when the pedestal structure is not in use. The pedestal structure may be directly drawn out of and rotated with respect to the main body as the support of the main body.

7 Claims, 11 Drawing Sheets

FLAT PANEL DISPLAY HAVING STORABLE PEDESTAL

BACKGROUND OF THE INVENTION

1. Field of the Invention

The invention relates to a flat panel display, and more particularly, to a flat panel display having storable pedestal.

2. Description of the Prior Art

In recent years, flat panel display (FPD) has replaced cathode ray tube (CRT) type display as the mainstream display apparatus in home and business application. Without the cumbersome size and weight, the FPD also shares low power consumption, low radiation, decreased thickness in every advantageous feature admired. Also, the increasing size of the FPD has made such thin type digital flat televisions popular in consumer's entertainments, such as home watching, outdoor ads, exhibitions, etc. The flat panel display as information apparatus is mainly categorized into two types: liquid crystal display (LCD) and plasma display panel (PDP), both use pedestal to stand on the table or wall-mount equipment to be installed on the wall. The pedestal of the FPD is usually detachable from the main body of the FPD to cut off the overall package size and save cost of transportation.

Even with the detachable feature, the pedestal of a conventional FPD still occupies a certain area to securely and steadily support the main body upright. The large area, along with a certain thickness of an object like the pedestal requires quite a lot space from the box when packing the FPD therein. On the other hand, detachability means more work is necessary to assemble the pedestal to the main body and disassemble it. Except for the detachable type pedestal, it is clearly obvious that for the FPD with fixed pedestal at the bottom, much more space is required to pack the FPD even though the FPD need no work on assembling the pedestal.

SUMMARY OF THE INVENTION

Due to the problem caused by conventional pedestal design in FPD, the invention provides a flat panel display with storable pedestal, which can be stored in the main body of the flat panel display when not in use, like transporting, boxing, wall mounting, etc., and can substantially reduce the overall size of the flat panel display. The pedestal may be directly moved out of the main body for use.

The invention provides a flat panel display having storage pedestal. The flat panel display includes a main body and a pedestal structure. The main body includes a first container and a second container at a bottom of the main body. The pedestal structure is storable in the main body. The pedestal structure includes a first stand and a second stand. The first stand and the second stand are contained in the first container and the second container respectively so as to be hid at a storing position in the main body.

The first stand and the second stand of the flat panel display are moveable out of the first container and the second container along a vertical direction and rotatable along the axis of the vertical direction to a using position so as to support the main body.

The pedestal structure of the flat panel display may be completely stored in the main body to save the extra room needed for the pedestal structure during transporting, boxing or wall mounting. The pedestal structure is easy to be partially drawn out of the main body of the flat panel display to support the main body, adding convenient usability to the pedestal structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
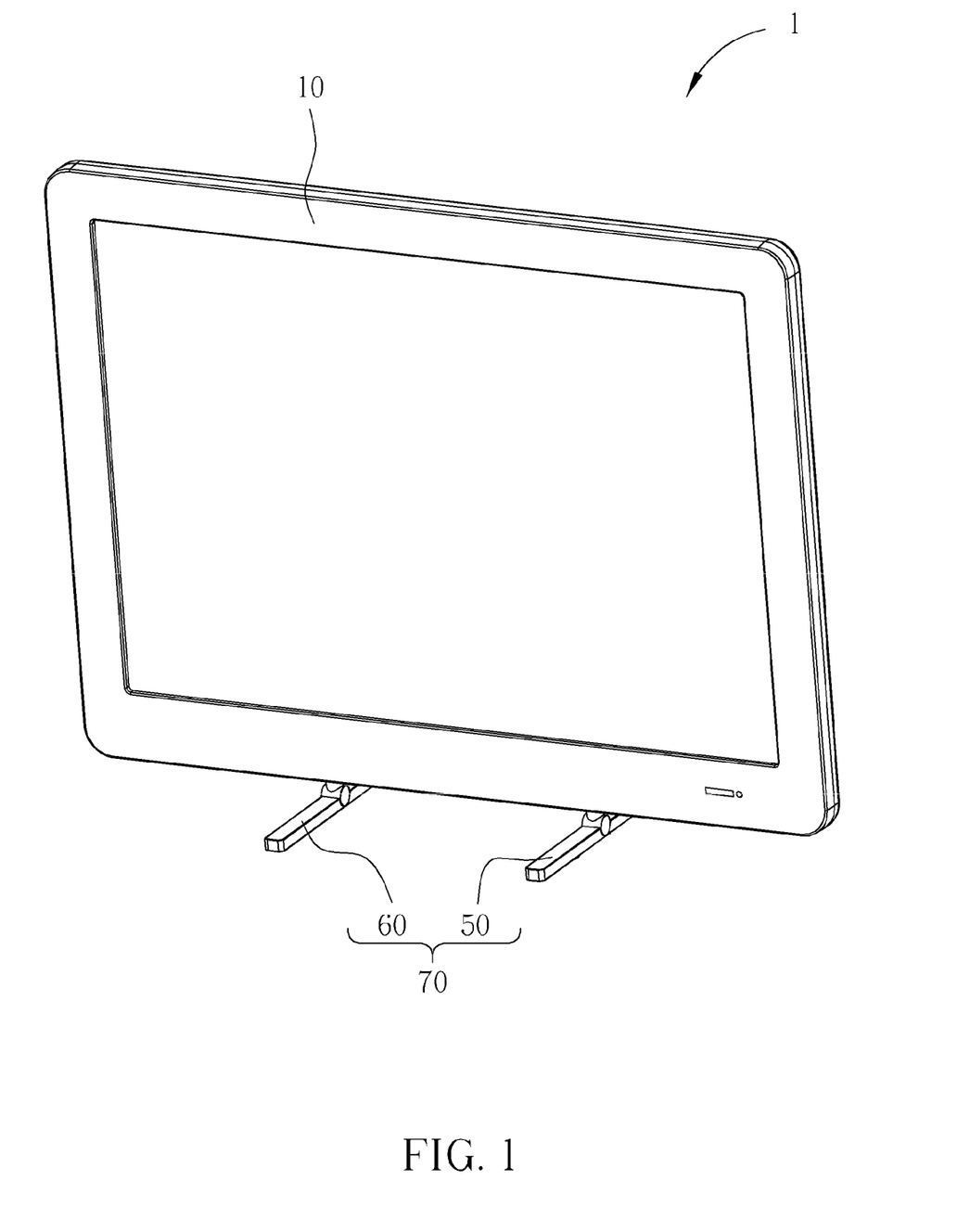
FIG. 1 is an illustration of a flat panel display having storable pedestal according to the invention.

Please refer to FIG. 1, which is an illustration of a flat panel display 1 having storable pedestal. The flat panel display 1 includes a main body 10 and a pedestal structure 70. The pedestal structure 70 includes a first stand 50 and a second stand 60 capable of supporting the main body 10 on a desk or any plain surface. To have light weight yet still sufficient stiffness for support, the pedestal structure 70 is preferably made of Zn—Al alloy. It can also use other metal, alloy, or compound material with sufficient structural stiffness for the pedestal structure 70.

Figure 2:
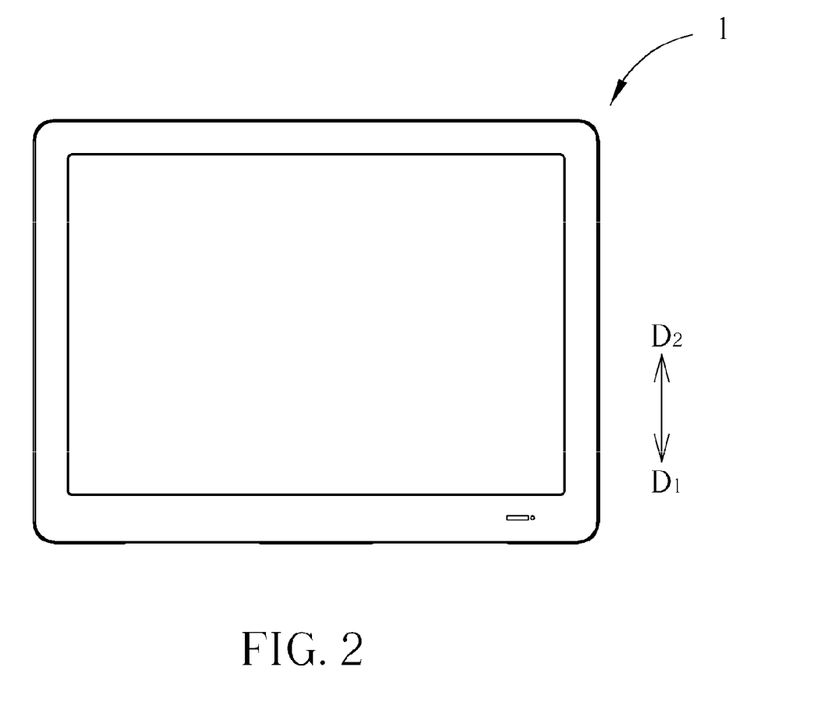
FIG. 2 is an illustration showing the front view of the flat panel display where the pedestal structure is completely stored and hid in the main body.
Figure 3:
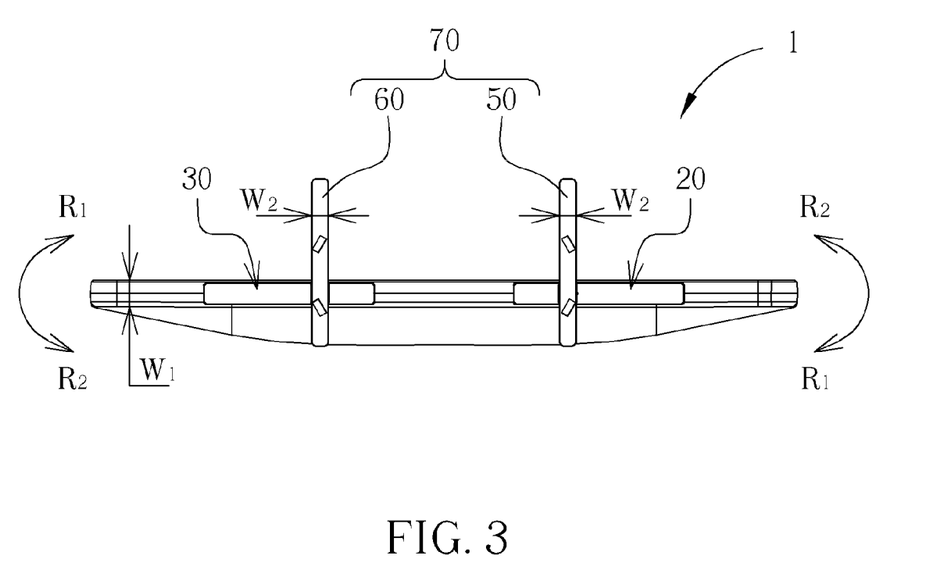
FIG. 3 is an illustration of a bottom of the flat panel display.

Please refer to FIG. 2 and FIG. 3. FIG. 2 is an illustration showing the front view of the flat panel display 1 where the pedestal structure 70 is completely stored and hid in the main body 10 and FIG. 3 is an illustration of a bottom of the flat panel display 1. The pedestal structure 70 may be configured at a using position as shown in FIG. 1 or FIG. 3 for supporting the main body 10, or at a storing position where the pedestal structure 70 is hid in the main body 10 as showing in FIG. 2 (the pedestal structure 70 is invisible from the perspective view angle in FIG. 2) when not in use. To store the pedestal structure 70, the main body 10 uses a first container 20 and a second container 30 at the bottom of the main body 10, and the first stand 50 and the second stand 60 of the pedestal structure 70 are contained in the first container 20 and the second container 30 respectively to be hid at the storing position.

Figure 4:
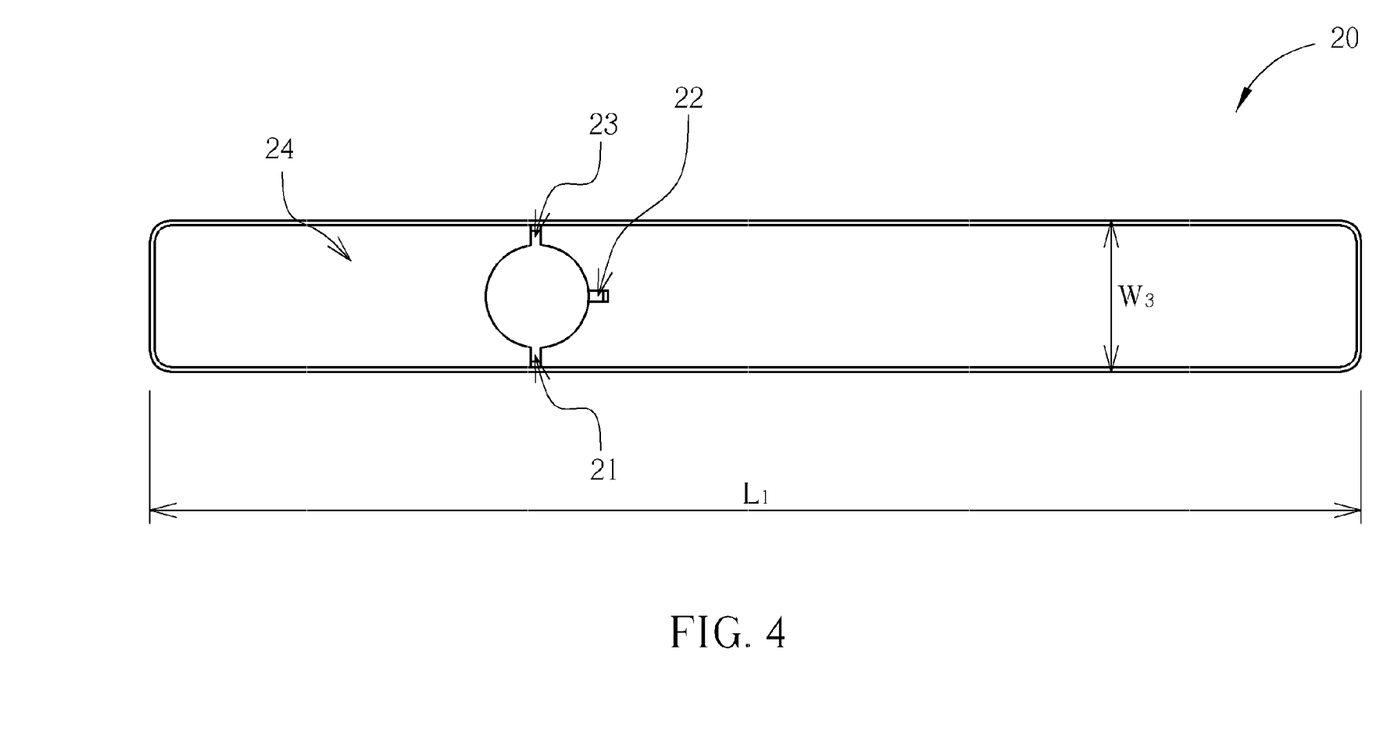
FIG. 4 is an illustration of the first container of the main body.
Figure 5:
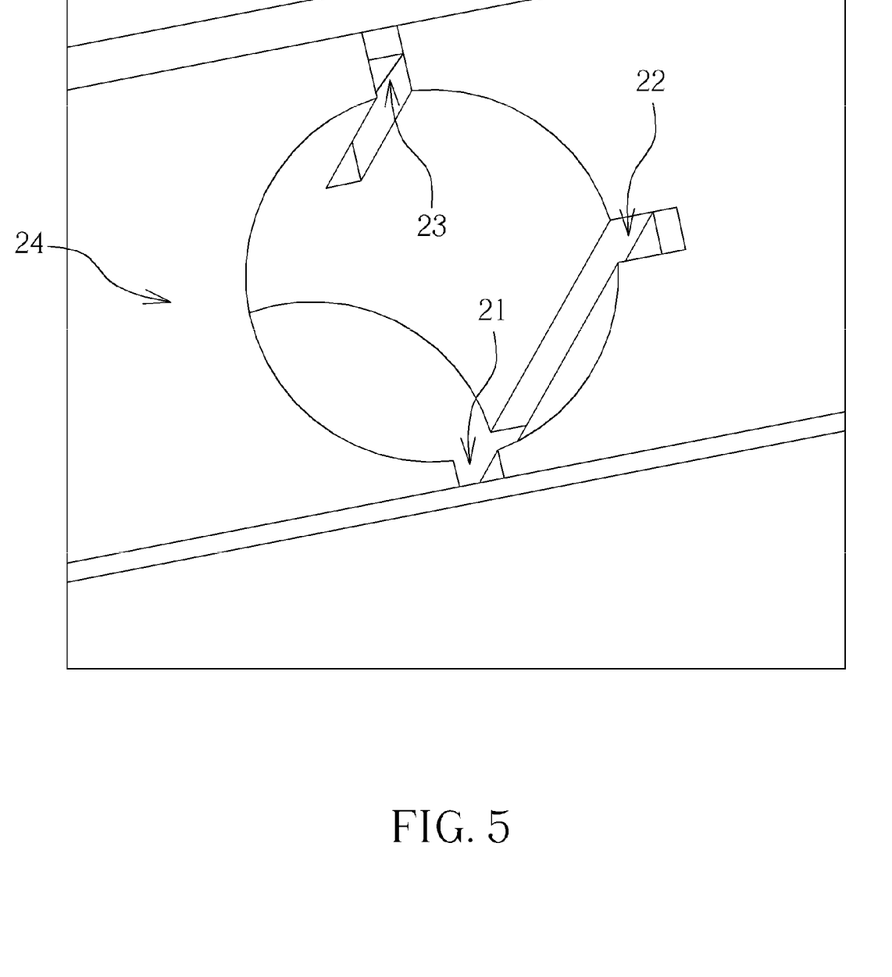
FIG. 5 is an illustration of the partial view of the first container.

Please refer to FIG. 4 and FIG. 5. FIG. 4 is an illustration of the first container 20 of the main body 10 and FIG. 5 is an illustration of the partial view of the first container 20. The first container 20 includes a first opening 24, and a first groove 21, a second groove 22, and a third groove 23. Likewise, the second container 30 includes a second opening, and a first groove, a second groove, and a third groove. Please also refer to FIG. 6, which is an illustration showing the first stand 50 and the second stand 60 of the pedestal structure 70. The first stand 50 includes a first axle 51 and a first seat 52. The first axle 51 is a cylinder and the first seat 52 is a cuboid with length $L_2$ and thickness $W_2$. In the embodiment of the invention, the first axle 51 is perpendicularly assembled to the first seat 52 to form the T-shape first stand 50. A hinge component 53 may further be disposed between the first axle 51 and the first seat 52, which provides the first axle 51 for tilting an angle with respect to the first seat 52. The first axle 51 has a first protrusion 511 and a second protrusion 512. Likewise, the second stand 60 includes a second axle 61 and a second seat 62. Similarly, the second axle 61 is a cylinder and the second seat 62 is a cuboid with length $L_2$ and thickness $W_2$. In the embodiment of the invention, the second axle 61 is perpendicularly assembled to the second seat 62 to form the T-shape second stand 60. A hinge component 63 may further be disposed between the second axle 61 and the second seat 62, which provides the second axle 61 for tilting an angle with respect to the second seat 62. The second axle 61 also has a first protrusion 611 and a second protrusion 612.

As described early, the pedestal structure 70 of the invention may be completely stored in the containers of the main body 10 when not in use. Please refer to FIG. 4~FIG. 6. The first opening 24 of the first container 20 has substantially the same shape as the first seat 52 of the first stand 50. Hence, the length $L_1$ of the first opening 24 is approximately the same as or slightly longer than the length $L_2$ of the first seat 52, while the thickness $W_2$ of the first seat 52 approximately equals to or smaller than the width $W_3$ of the first opening 24, and smaller than the thickness $W_1$ of the main body 10 (referring to FIG. 3). The structural relation of the second container 30 and the second stand 60 is similar, whose description is omitted here for brevity. In the following description, the first stand 50 along with the first container 20 are used as descriptive example, while the second stand 60 and the second container 30 may also apply.

Figure 7:
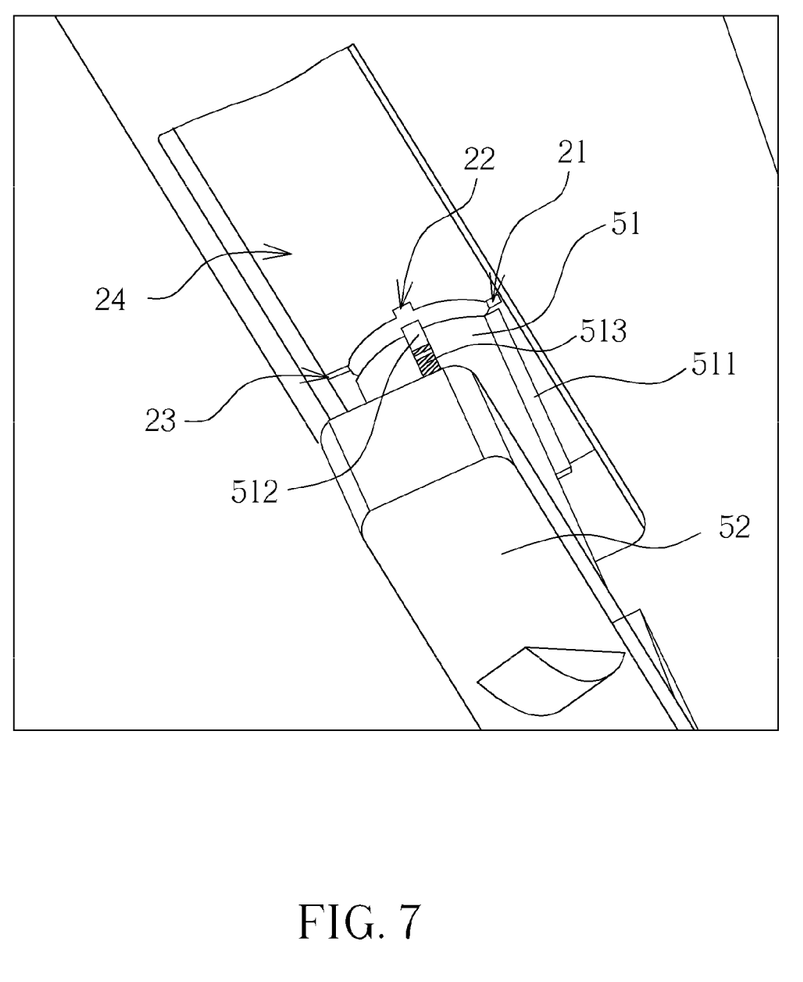
FIG. 7 is an illustration showing the state that the first stand is moveable in the first container to the storing position.

Please refer to FIG. 7, which is an illustration showing the state that the first stand 50 is moveable in the first container 20 to the storing position. As previously mentioned, the first axle 51 of the first stand 50 includes the first protrusion 511 and the second protrusion 512, which are used to cooperate with the first groove 21, the second groove 22, and the third groove 23 of the first container 20. Practically, as the pedestal structure 70 is preferably having perpendicular orientation with respect to the main body 10 after moving out from the main body 10 to the using position, the first protrusion 511 and the second protrusion 512 locate on the first axle 51 preferably, but not as a limitation, in a perpendicular 90 degree apart. In FIG. 4, the first groove 21, the second groove 22, and the third groove 23 also locate 90 degree apart from each other. Regarding the state in FIG. 7, which the first stand 50 is parallel with the orientation of the main body 10, the first protrusion 511 and the second protrusion 512 of the first axle 51 may be moved along direction $D_2$ as is referred in FIG. 2 and moved in the first groove 21 and the second groove 22 of the first container 20 respectively all the way to the storing position as shown in FIG. 2. The two grooves 21, 22 of the first container 20 may also restrain the first stand 50 from rotating along the axis of a vertical direction, or direction $D_1D_2$ as in FIG. 2.

Figure 6:
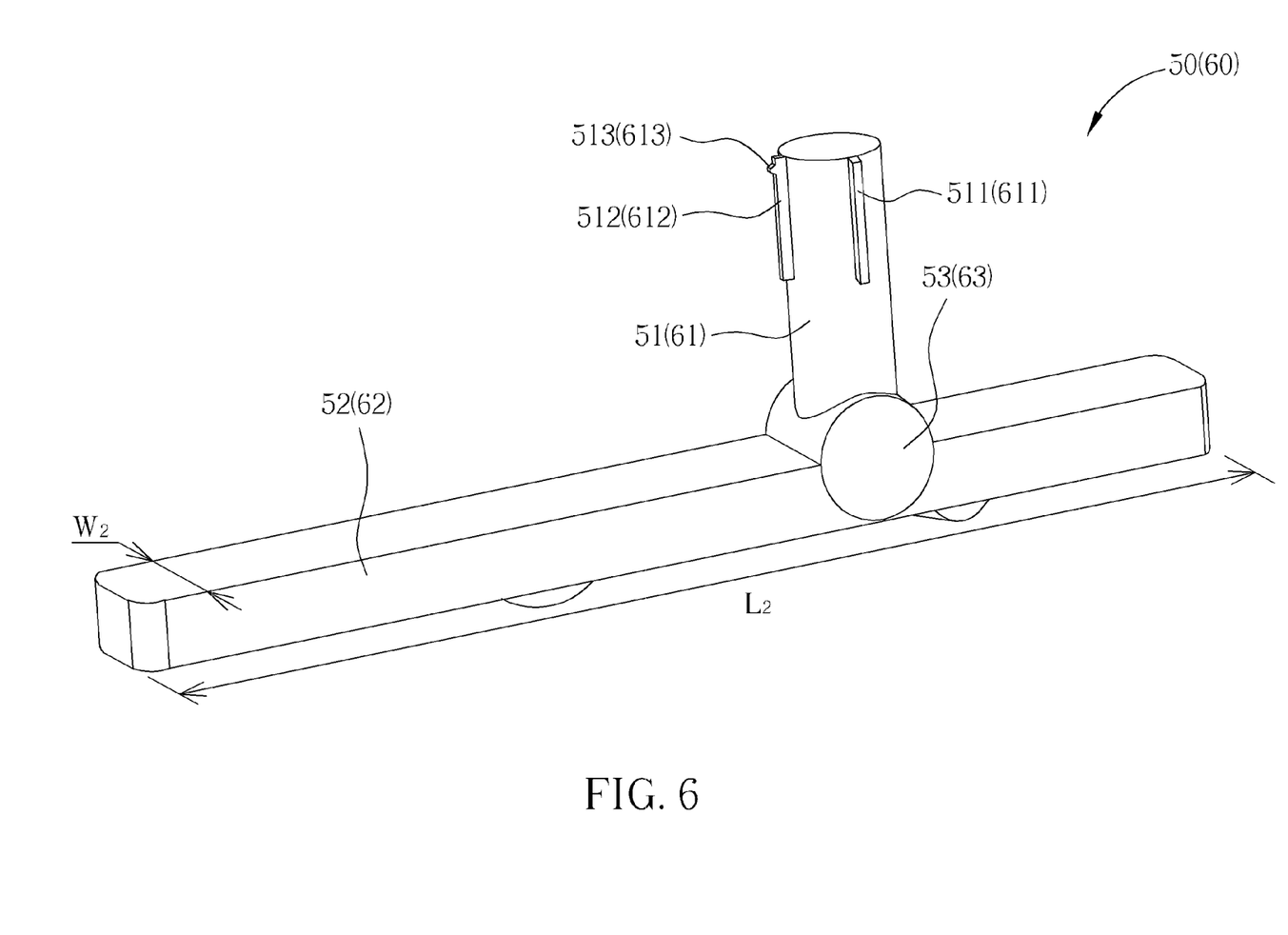
FIG. 6 is an illustration showing the first stand and the second stand of the pedestal structure.
Figure 8:
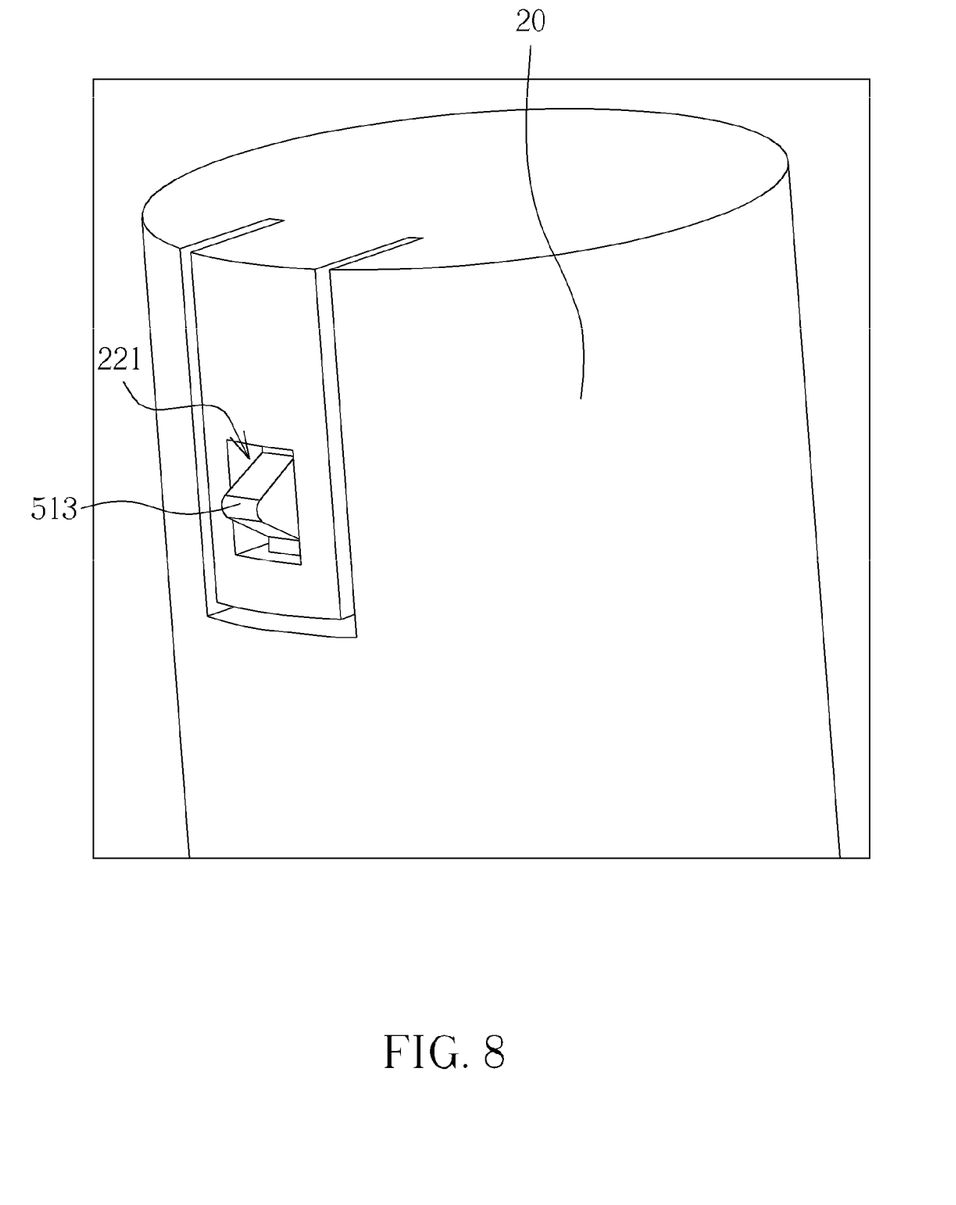
FIG. 8 is an illustration showing the partial view of the first stand located at the storing position in the first container.

Please refer to FIG. 8, which is an illustration showing the partial view of the first stand 50 located at the storing position in the first container 20. The first axle 51 of the first stand 50 further has an engaging bump 513 located on the second protrusion 512. The second axle 61 of the second stand 60 also has an engaging bump 613 located on the second protrusion 612 as shown in FIG. 6. The second groove 22 further has an engaging slot 221. When the first stand 50 is located at the storing position, the engaging bump 513 may engage with the engaging slot 221 so that the first stand 50 may be restrained from moving out of the first container 20 along direction $D_1$, i.e., the vertical direction. Preferably, the engaging bump 513 may be triangular or a salient point with arcs at both sides, which may be disengaged from the engaging slot 221 to move the first stand 50 out of the storing position when the first stand 50 is exerted with a certain force along direction $D_1$.

Figure 9:
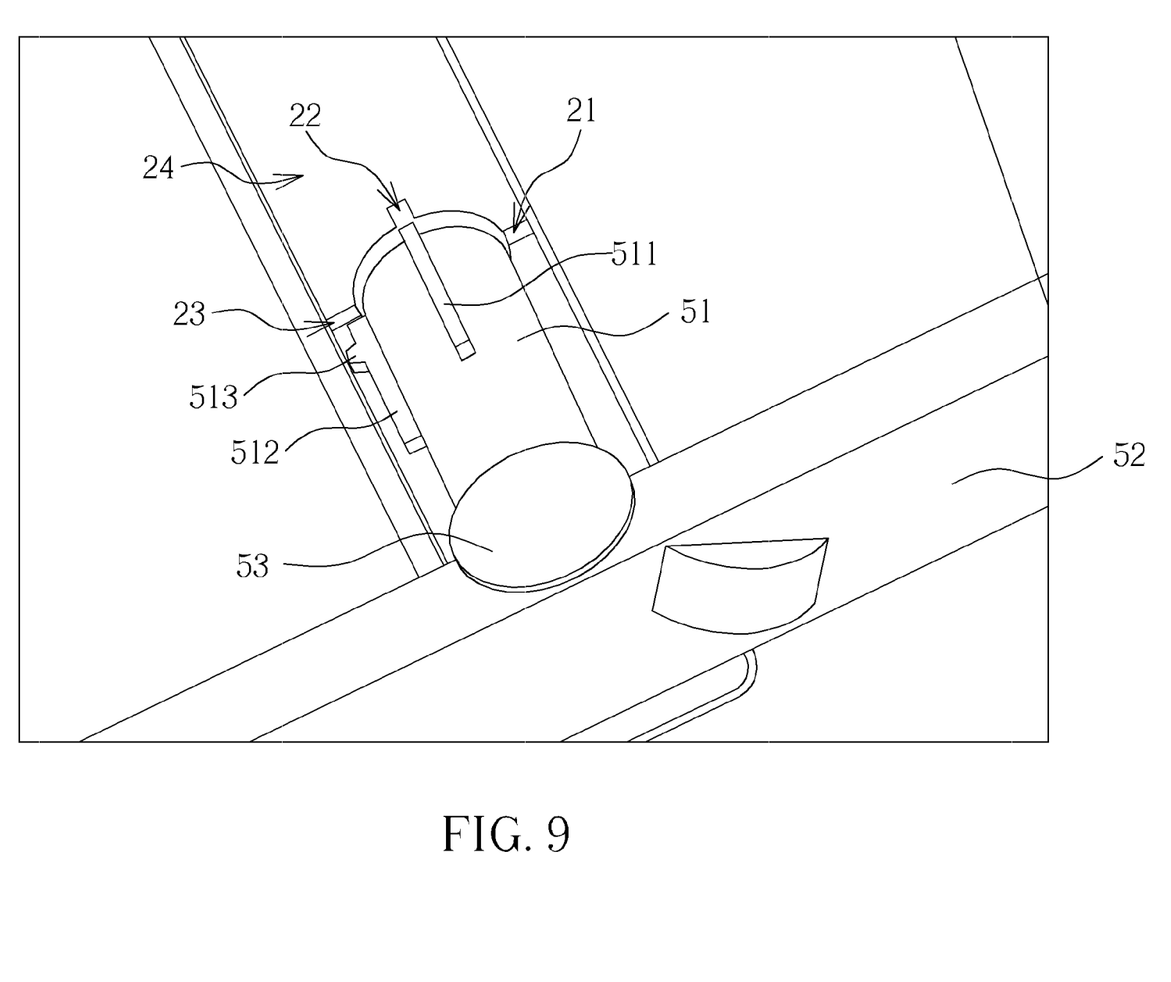
FIG. 9 is an illustration showing the first stand moving to a using position with respect to the first container.
Figure 10:
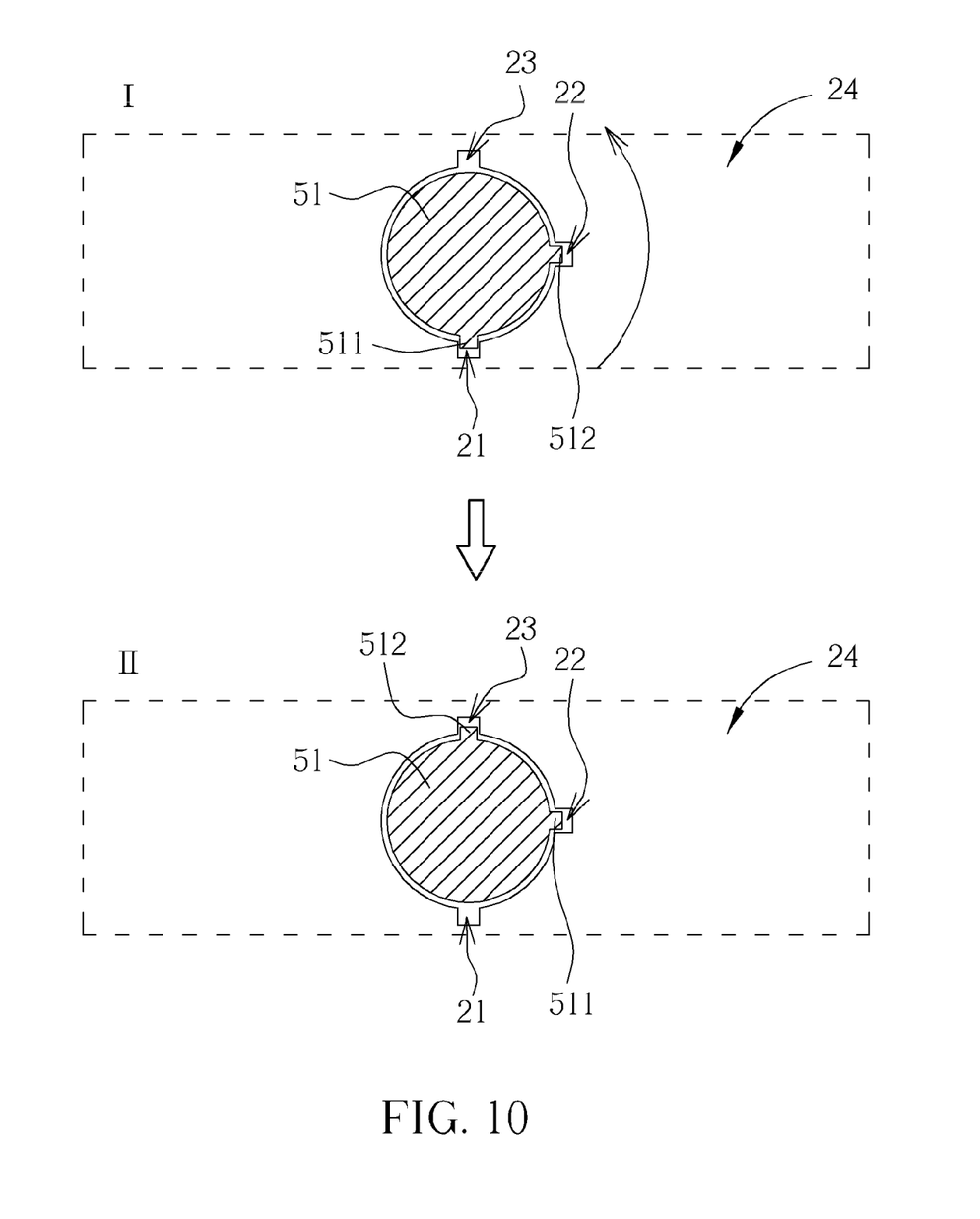
FIG. 10 is an illustration of the states of the pedestal structure of the flat panel display being pulled and rotated with respect to the main body.

Please refer to FIG. 9, which is an illustration showing the first stand 50 moving to a using position with respect to the first container 20. To move the pedestal structure 70 from the storing position in FIG. 2 to the using position in FIG. 1 or FIG. 3 to support the main body 10, pulling the first stand 50 (and the second stand 60) along direction $D_1$ or the vertical direction can disengage the engaging bump 513 from the engaging slot 221. The first stand 50 is then rotatable along the axis of direction $D_1$ to the using position as shown in FIG. 9 after the first protrusion 511 and the second protrusion 512 of the first axle 51 are no longer located in the first groove 21 and the second groove 22 respectively. Preferably, the first stand 50 (and the second stand 60) rotates for 90 degree with respect to the first container 20 (and the second container 30) so that the first seat 52 (and the second seat 62) is made perpendicular to the main body 10 to provide well support. As the first stand 50 is rotated for 90 degree with respect to the first container 20, the first protrusion 511 and the second protrusion 512 of the first axle 51 are now aligned with the second groove 22 and the third groove 23 of the first container 20 respectively. Slightly moving the first stand 50 along direction $D_2$ with respect to the first container 20 will locate the first protrusion 511 and the second protrusion 512 at the second groove 22 and the third groove 23 respectively. Please refer to FIG. 5. FIG. 5 shows that the third groove 23 has shorter length than the groove 22 that only allows the second protrusion 512 to move in the third groove 23 for a shorter distance. On the other hand, the first seat 52 of the first stand 50 may also abut against the bottom surface of the main body 10. When the pedestal structure 70 is set at the using position as shown in FIG. 1, FIG. 3, and FIG. 9, the two grooves 22, 23 of the first container 20 restrain the first stand 50 from rotating along the axis of the direction $D_1D_2$ as in FIG. 2. Please also refer to FIG. 10 for the states of the pedestal structure 70 of the flat panel display 1 being pulled and rotated from the storing position I in the main body 10 to the using position II.

Figure 11:
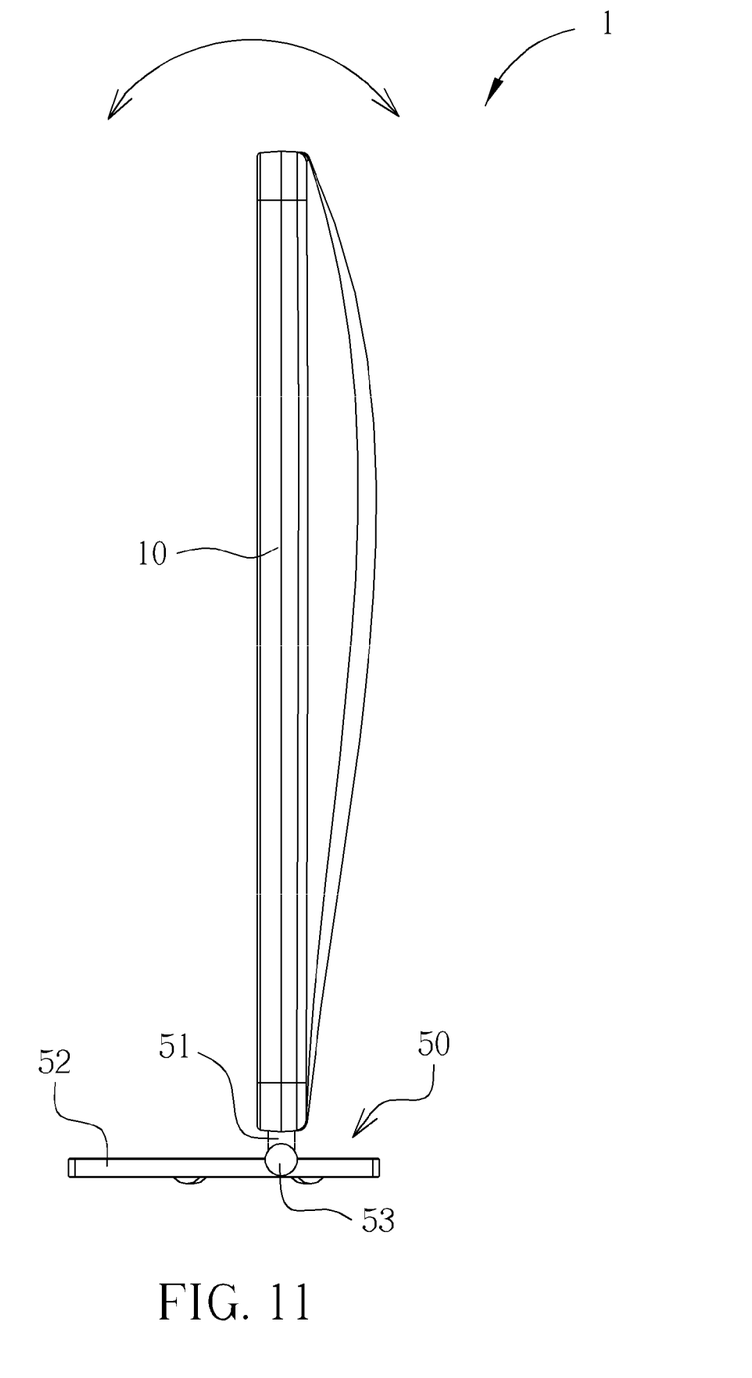
FIG. 11 is an illustration showing the side view of the flat panel display.

As previously mentioned, the hinge component 53 is disposed between the first axle 51 and the first seat 52 of the first stand 50, and the hinge component 63 is disposed between the second axle 61 and the second seat 62 of the second stand 60. Hence, in FIG. 11 showing the illustration of the side view of the flat panel display 1, when the pedestal structure 70 is set in the using position as shown, the hinge component 53 and the hinge component 63 may be used to tilt the first axle 51 an angle with respect to the first seat 52 and to tilt the second axle 61 the angle with respect to the second seat 62. Using the hinge components 53, 63, the main body 10 may be tilted the angle with respect to the first seat 52 and the second seat 62, which have the same level as the table or surface where the flat panel display 1 stands. Only the first stand 50 is illustrated in FIG. 11 due to the viewing perspective.

Figure 12:
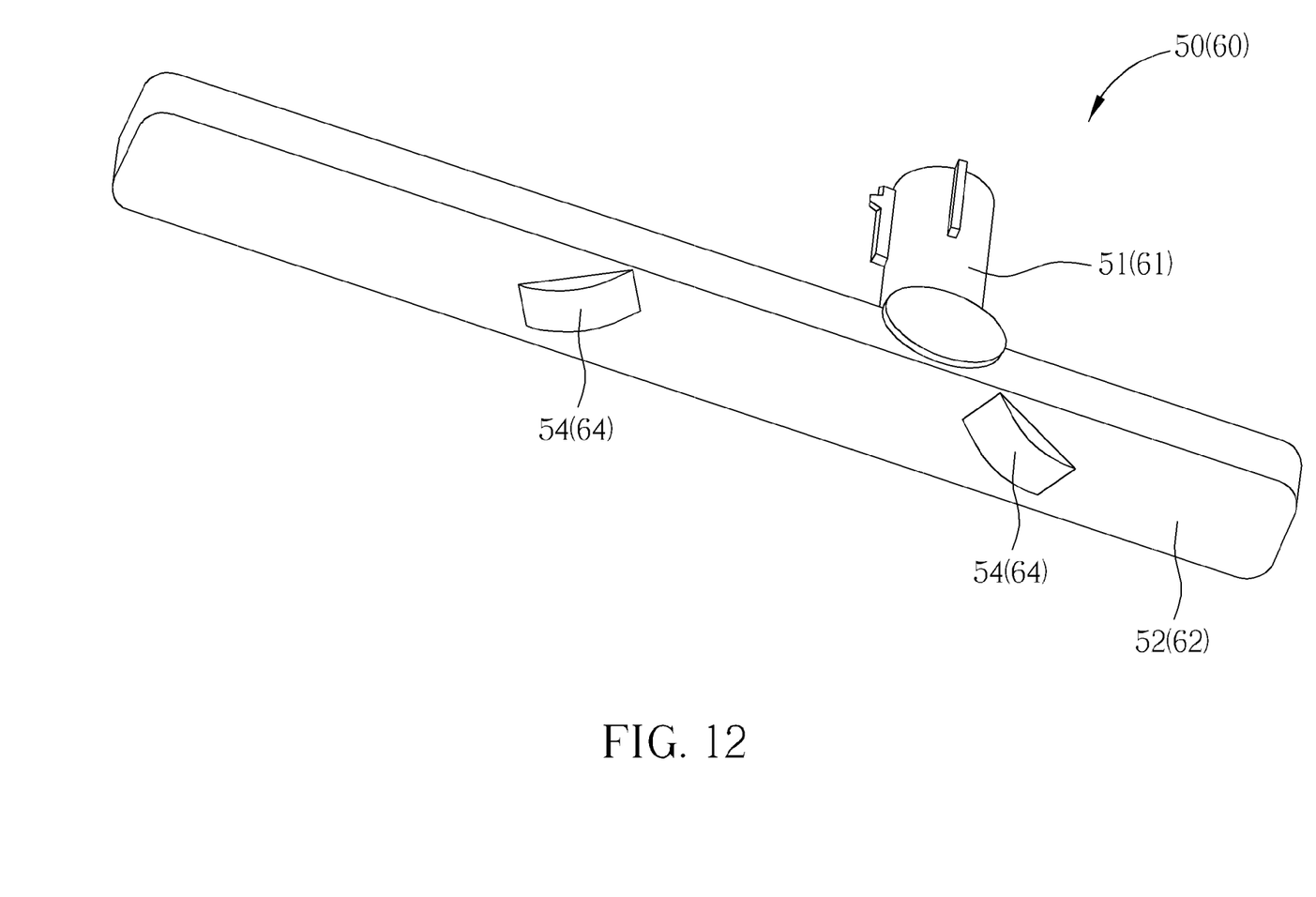
FIG. 12 is an illustration of the bottom view of the first stand and the second stand of the pedestal structure.

Please refer to FIG. 12, which is an illustration of the bottom view of the first stand 50 and the second stand 60 of the pedestal structure 70. Besides the tilting adjustment provided to the main body 10 by the pedestal structure 70 as shown in FIG. 11, a pair of wheels 54 and wheels 64 having different orientations may further be disposed at the bottom of the first stand 50 and the second stand 60 respectively to provide swiveling adjustment for the main body 10 along direction $R_1R_2$ when the pedestal structure 70 is set at the using position at shown in FIG. 3.

In the embodiments of the invention, the pedestal structure of the flat panel display is made storable and disposed at the bottom of the main body of the flat panel display. The pedestal structure has substantially similar shape as the container of the main body that contains the pedestal structure and is capable of being completely hid in the main body when the pedestal structure is not in use. The pedestal structure may be directly drawn out of and rotated with respect to the main body as the support of the main body.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat panel display having storable pedestal, comprising: a main body, comprising a first container and a second container at a bottom of the main body; and a pedestal structure storable in the main body, the pedestal structure comprising a first stand and a second stand, the first stand and the second stand contained in the first container and the second container respectively so as to be hid at a storing position in the main body; wherein the first stand comprises a first axle and a first seat, the second stand comprises a second axle and a second seat, each of the first axle and the second axle comprises a first protrusion and a second protrusion, and each of the first container and the second container comprises a first groove, a second groove, and a third groove; wherein when the first stand and the second stand are contained in the first container and the second container at the storing position in the main body respectively, the first protrusion and the second protrusion of the first axle are respectively located in the first groove and the second groove of the first container, the first protrusion and the second protrusion of the second axle are respectively located in the first groove and the second groove of the second container, and the first container and the second container restrain the first stand and the second stand from rotating along the axis of a vertical direction; wherein when the first stand and the second stand respectively move out of the first container and the second container along the vertical direction and rotate along the axis of the vertical direction to a using position, the first protrusion and the second protrusion of the first axle are located respectively in the second groove and the third groove of the first container, the first protrusion and the second protrusion of the second axle are located respectively in the second groove and the third groove of the second container, and the first container and the second container restrain the first stand and the second stand from rotating along the axis of the vertical direction.

2. The flat panel display of claim 1, wherein the first axle is perpendicularly assembled to the first seat and the second axle is perpendicularly assembled to the second seat such that the first stand and the second stand are with T-shape.

3. The flat panel display of claim 1, wherein each of the first stand and the second stand comprises a hinge component, disposed between the first axle and the first seat, and between the second axle and the second seat, the hinge component of the first stand tilting the first axle an angle with respect to the first seat and the hinge component of the second stand tilting the second axle the angle with respect to the second seat, the pedestal structure tilting the main body the angle when moving out of the first container and the second container along the vertical direction and rotating along the axis of the vertical direction to the using position.

4. The flat panel display of claim 1, wherein the first container and the second container comprise a first opening and a second opening respectively, the first opening and the second opening located at a bottom surface of the main body and having substantially the same contour as the first seat and the second seat respectively.

5. The flat panel display of claim 1, wherein each second protrusion of the first axle and the second axle comprises an engaging bump, each second groove of the first container and the second container comprises an engaging slot; when the first stand and the second stand are respectively contained in the first container and the second container, each engaging bump of the first axle and the second axle engages respectively with corresponding engaging slot of the first container and the second container for restraining the first stand from moving out of the first container and restraining the second stand from moving out of the second container along the vertical direction.

6. The flat panel display of claim 1, wherein each of the first stand and the second stand has a pair of wheels, the two pair of wheels of the first stand and the second stand having different orientations.

7. The flat panel display of claim 1, wherein the pedestal structure is made of Zn—Al alloy.

* * * * *